United States Patent

[11] 3,580,282

[72] Inventors Lyle R. Van Arsdale;
 Francis M. Lathrop, II, Houston, Tex.
[21] Appl. No. 770,270
[22] Filed Oct. 24, 1968
[45] Patented May 25, 1971
[73] Assignee M & J Valve Company
 Houston, Tex.
 Continuation-in-part of application Ser. No.
 719,338, Apr. 8, 1968, now abandoned.

[54] VALVE-OPERATING SYSTEM
 2 Claims, 1 Drawing Fig.

[52] U.S. Cl. ..................................... 137/608
[51] Int. Cl. ..................................... F17d 1/00
[50] Field of Search .......................... 137/608,
 609, 595, 637; 251/29, 19, 20

[56] References Cited
 UNITED STATES PATENTS
 2,252,800 8/1941 Daniels ................. 137/637X
 2,330,447 9/1943 Posey ................... 137/608
 2,698,717 1/1955 Sisco .................... 251/19X
 3,139,111 6/1964 Schneider et al. ..... 137/607X
 3,158,174 11/1964 Stalnecker et al. .... 251/29X
 3,252,472 5/1966 Natho ................... 251/29X
 3,409,048 11/1968 Brown .................. 137/609X Primary Examiner—Samuel Scott
Attorney—Flehr, Hohbach, Test, Albritton & Herbert ABSTRACT: A system including power operators for two or more main flow control valves. Devices (e.g., four-way valves) serve to control supply of energy (e.g., liquid under pressure) to the power operators, and in turn are conditioned by electrical means. In the event of failure of the electrical power supply, both of the control devices are set whereby the main valves are moved to or remain in a safe condition (e.g., closed).

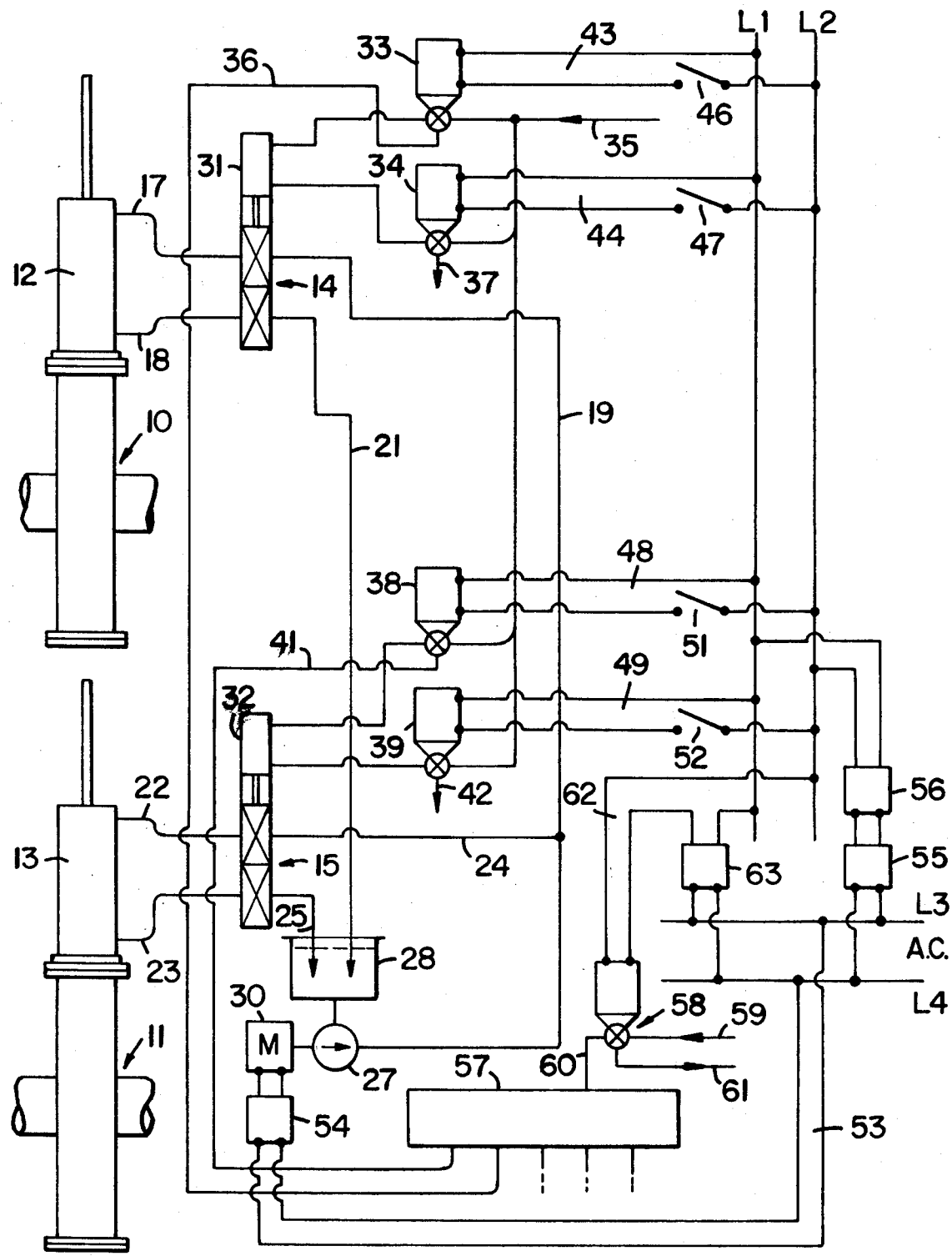

3,580,282

1

VALVE-OPERATING SYSTEM

CROSS-REFERENCE TO RELATED APPLICATIONS

This application is in part a continuation of subject matter disclosed and claimed in copending application Ser. No. 719,338 filed Apr. 8, 1968, and entitled "Pipeline By-Pass Flow Control System and Method." which is now abandoned.

BACKGROUND OF THE INVENTION

In systems making use of two or more main power-operated valves, it is common practice to provide individual control devices associated with each power operator to control its operation. These devices may for example be electrical reversing switches for electrical operators, or four-way valves for operators of the hydraulic type. Such four-way valves may connect with sources of liquid under pressure and they control supply and exhaust of hydraulic liquid to the fluid chambers of the hydraulic operator. Various arrangements can be provided for setting each such four-way control valve. They may be set manually or from a remote station. For programmed operation they may be under control of a punched tape or punch card. Essential parts of such a system, such as solenoid operators or solenoid valves, are generally energized and operated electrically. In the event of electrical power failure, the entire system becomes inoperative, and the main valves may be left in an unsafe condition.

SUMMARY OF THE INVENTION AND OBJECTS

This invention relates generally to systems for the operation of two or more related flow control valves, where the valves are provided with power operators.

It is an object of the invention to provide a system of the above character which, in the event of electrical power failure, will cause the main valve to assume or remain in a desired safe condition.

Another object of the invention is to provide a system of the above character which is particularly applicable where the valve operators are of the double-acting hydraulic type, together with four-way valves connected to the operators to control supply and exhaust of hydraulic liquid. The present invention is characterized by means whereby the control valves can be operated individually, but are both acted upon in the event of power failure to cause the power operators to condition the main valves to prevent hazards to associated equipment.

Another object of the invention is to provide a system of the above character which makes use of overriding pneumatic pressure for conditioning the control valves of the system in the event of a power failure.

The present invention makes use of two or more power-operated main flow control valves. The operators are adapted to be energized to open and close the associated main valve. A control device is connected to each of the valve operators for controlling the supply of energy to the same. Each control device has two operating positions, in one of which the associated operator opens the main valve, and in the other of which the power operator closes the associated main valve. Means are also associated with each of the control valves for setting the same in either one or the other of the two positions. In addition, a common means is associated with both of the control devices for conditioning the same to ensure that the main valves will be moved to or left in a safe condition in the event of power failure for the system.

Additional objects and features of the invention will appear from the following description in which the preferred embodiment has been set forth in detail in conjunction with the accompanying drawing.

BRIEF DESCRIPTION OF THE DRAWING

The single FIG. is a schematic layout and circuit diagram illustrating the present system and method.

2

DESCRIPTION OF THE PREFERRED EMBODIMENT

The drawing illustrates a system incorporating two main valves 10 and 11 of the gate type, and which are presumed to control flow of gas or liquid in an overall system. In the petroleum industry the overall system may for example be for the gathering of liquid or gas in connection with producing wells, a pumping station in connection with pipe transmission lines, a tank farm for the storage of liquid products, a custody transfer system for the handling of products through pipe transmission lines, a metering or meter prover system, a ship-to-shore transfer system, or a system for the handling of products from offshore barges or platforms. In most instances the system will use more than two main flow control valves. Each of the valves 10 and 11 is equipped with a power operator 12 and 13. In this instance it is assumed that the power operator is of the double-acting hydraulic type, comprising a cylinder and a piston connected to the gate of the main valve. The fluid chambers of the hydraulic operators are shown connected by piping to four-way control valves 14 and 15 which in turn are electrically controlled. With respect to valve 14, lines 17 and 18 connect the valve with the hydraulic chambers of the operator 12. Also control valve 14 connects with the liquid pressure line 19 and the liquid exhaust line 21. Control valve 15 is similarly connected with operator 13 by lines 22 and 23, and it connects with the liquid pressure line 24 and exhaust line 25.

As representative of suitable means for supplying liquid under pressure, a hydraulic pump 27 is shown having its discharge side connected to the lines 19 and 24 and its suction side connected to the reservoir 28. This reservoir receives liquid from the control valves 14 and 15. Motor 27 is shown being driven by the electric motor 30.

The system illustrated in the drawing also has electropneumatic means for operating the four-way valves 14 and 15. Thus pneumatic operators 31 and 32 of the cylinder piston type have their pistons mechanically connected to the operating rods of the four-way valves 14 and 15. With respect to pneumatic operator 31, solenoid valves 33 and 34 serve to control application of pneumatic pressure from the air pressure line 35 whereby the operator 31 is energized to move and set the four-way valve in either one of its two operating positions. The arrangement is such that when solenoid 33 is operated, air pressure is supplied to the operated 31 in such am manner that the four-way valve is set to cause the hydraulic power operator 12 to close the associated gate valve 10. When solenoid 34 is operated, pneumatic pressure is supplied to set the four-way valve 14 in its other position, thus causing the hydraulic operator 12 to open the gate valve. When the solenoid valve 33 is not being electrically energized, it vents through the pneumatic operator 31 through the line 36. When solenoid 34 is not being deenergized, it vents through the line 37. In other words, when solenoid valve 33 is electrically energized, it causes pneumatic pressure to be applied to the upper end of pneumatic operator 31 as illustrated in the drawing. However, when the solenoid valve 33 is deenergized, pneumatic pressure vents back from operator 31 into the line 36. Solenoid valve 34 functions in the same manner, but the venting is to atmosphere.

The solenoid valves 38 and 39 for the pneumatic operator 32 are likewise connected in the same manner to the air pressure supply line 35. Here again solenoid valve 38 vents through line 41 when it is deenergized, and solenoid valve 39 vents to the atmosphere through line 42. The solenoid valves 33 and 38 can be referred to as closing solenoids since they initiate closing of the associated main gate valves when these solenoid valves are energized. The other solenoid valves 34 and 39 can be referred to as opening solenoids.

Electrical lines L1 and L2 are representative of current supply lines of suitable voltage for energizing the solenoid valves. Circuits 43 and 44 connect between lines L1 and L2 and the windings of the solenoid valves 33 and 34 and are provided with control switches 46 and 47. Similar circuits 48 and 49 connect with the windings of solenoid valves 38 and 39 and are provided with switches 51 and 52.

Alternating current lines L3 and L4 represent a higher voltage power source. Motor 30 is shown connected to these lines by circuit 53 through the starting box 54. It is assumed that lines L1 and L2 together with lines L3 and L4 actually represent a common power source. In other words, a stepdown transformer 55 and rectifier 56 connect with lines L3 and L4 to supply direct current at a suitable lower voltage to the lines L1 and L2.

Both of the pneumatic exhaust lines 36 and 41 connect to a common pneumatic reservoir 57. A solenoid valve 58 connects to a source of pneumatic pressure through line 59 and also with reservoir 56 through line 59. When this valve is energized, line 60 is vented to the atmosphere through line 61. However, when the solenoid valve 58 is deenergized, line 60 is placed in communication with the air supply line 59 whereby a substantial pressure is applied to the reservoir 56.

The windings of solenoid valve 58 connect with a circuit 62 which includes the current supply lines L1 and L2 and a voltage-sensing device 63. This sensing device also connects across the lines L3 and L4 and is set or adjusted whereby when the voltage across lines L3 and L4 falls below a predetermined normal value, contacts in device 63 are opened to open the circuit 62 and thus deenergize the windings of solenoid valve 58. As pointed out above, this serves to pressurize the reservoir 57.

Operation of the system and method is as follows. It is assumed that the switches 46 and 47 for valve 10 and the switches 51 and 52 for valve 11 are operated either manually or through some control device, such as a perforated tape, perforated card or the like, to cause the opening and closing of the valves 10 and 11 as desired. Also it is assumed that one desires to be certain that the valves 10 and 11 are in closed position, or moved to closed position, in the event of power failure. Normally when the power is normal, or in other words, when the voltage is within normal limits across lines L3 and L4, the solenoid valve 57 remains energized, and therefore the reservoir 56 is at atmospheric pressure. Under such conditions, selective operation of switches 46 and 47 for valve 10 serves to energize and deenergize the solenoid valves 33 and 34 which in turn energizes the pneumatic operator 31 to condition the four-way valve 14 to cause hydraulic liquid to be supplied to the operator 12 to close or open the main valve. The same applies to operation of switches 51 and 52 for the valve 11. In the event of an electrical power failure, one or both of the main valves may be in open position. Also one or both of the main valves may be in the process of moving to open position. When a power failure does occur, the winding of solenoid 58 is deenergized as previously described, and this causes the reservoir 57 to be pressurized. This serves to apply overriding pressure through both of the lines 36 and 41, thereby making certain that the four-way valves 14 and 15 are positioned to cause operation of the hydraulic operators 12 and 13 to close a valve if it is open or in partially open position.

It will be evident from the foregoing that the present system and method makes possible a factor of safety in the operation of power operated valves. It does not interfere with the individual power operation of each valve, but it does ensure that valves are left in closed position in the event of a power failure.

In some instances it may be desirable to have the gate valves in open position after a power failure. In such event changes can be made to ensure that the overriding pneumatic pressure is applied through the opening solenoid valves rather than the closing valves.

We claim:

1. In a system for the power opening and closing of at least two main valves, a power operator of the hydraulic type connected to each of said valves and adapted to be energized by application of hydraulic liquid to operate the same, control valves of the four-way type connected to each of said operators and movable between two operating positions for controlling application and discharge of liquid from the same, electro pneumatic means associated with each of said four-way valves for setting the same, each of said means including a pneumatic operator mechanically connected to the associated four-way valve and two solenoid valves connected to control supply of pneumatic pressure to said pneumatic operator, said pneumatic operator exerting force to move the associated four-way valve from one operating position to the other, electrically energizing one of said solenoid valves serving to energize the pneumatic operator to move the associated four-way valve to cause the main valve to be closed, and electrically energizing the other solenoid valve serving to supply pneumatic pressure to the pneumatic operator to move the associated four-way valve to cause the power operator to open the valve, an electrical operating circuit connected to each of said solenoid valves, each circuit including a source of electrical power and a switch adapted to be closed or opened to selectively operate the associated solenoid valve, a vent line connected to each of said first one of said two solenoid valves, the other one of said solenoid valves being arranged to vent to the atmosphere, and means responsive to a failure of the electrical power connected to said circuits for supplying pneumatic pressure to both of said vent lines to provide overriding pneumatic pressure to said pneumatic operators, thereby ensuring that the four-way valves will be positioned to maintain the valves closed or to close the same.

2. A system as in claim 1 in which said last means consists of a pneumatic pressure reservoir, both of said vent lines being connected to said reservoir, and valve means for venting said pneumatic reservoir to atmosphere or to pressurize the same, said last means being responsive to an abnormal drop in electrical power supply voltage.